United States Patent Office 3,493,600
Patented Feb. 3, 1970

3,493,600
METHOD FOR PRODUCING CYANOACETYLENE
Katsura Morita, Ikeda, and Naoto Hashimoto, Suita, Japan, assignors to Takeda Chemical Industries, Ltd., Higashi-ku, Osaka, Japan
No Drawing. Filed July 21, 1967, Ser. No. 654,956
Claims priority, application Japan, July 29, 1966, 41/49,928
Int. Cl. C07c 121/30
U.S. Cl. 260—465.9
8 Claims

ABSTRACT OF THE DISCLOSURE

Cyanoacetylene is obtained in commercially feasible manner and yield by subjecting $\alpha,\beta$-dichloropropionitrile, $\alpha$-chloroacrylonitrile, $\beta$-chloroacrylonitrile, $\beta,\beta$-dichloropropionitrile or $\alpha,\alpha$-dichloropropionitrile to a temperature of 500–1500° C., optimally 700–1200° C., until the ensuing formation of cyanoacetylene is substantially complete, and isolating the thus-produced cyanoacetylene.

---

This invention relates to a method for producing cyanoacetylene. More particularly, it relates to a method for producing cyanoacetylene which comprises subjecting a chlorine-substituted tricarbon nitrile to gas phase reaction at elevated temperature.

Owing to its remarkable reactivity, cyanoacetylene, $HC{\equiv}C{-}CN$, is useful as an intermediate in the preparation of synthetic polymers, 3-amino-isoxazoles, and various nitrogen-containing compounds including purine bases, pyrimidine bases, etc.

Hitherto, cyanoacetylene has been prepared in practice by esterifying propiolic acid with ethanol, changing thus-prepared ester to the corresponding amide and then dehydrating the amide.

Since the known method requires many complicated steps, it has substantially been impossible to put the method into practice on a commercial scale.

Thus, it has been a desideratum in this field to provide a method of practical value for the production of cyanoacetylene on a commercial scale.

The main object of this invention is to provide a novel industrially feasible method for producing cyanoacetylene in a high yield.

According to the present invention, cyanoacetylene can easily be prepared by subjecting chloroine-substituted tricarbon nitrile of the formula

(I)

wherein each of two of $X_1$, $X_2$, $Y_1$, $Y_2$ is Cl and each of the other two is H, or $X_1$ and $Y_1$ form a double bond between the $\alpha$ and $\beta$ carbon atoms, while one of $X_2$ and $Y_2$ is Cl and the other is H, to gas phase reaction at elevated temperature.

The starting material (I) includes $\alpha,\beta$-dichloropropionitrile, $\alpha$-chloroacrylonitrile, $\beta$-chloroacrylonitrile, $\beta,\beta$-dichloropropionitrile, and $\alpha,\alpha$-dichloropropionitrile.

The optimal reaction temperature varies with pressure, but usually it is in the range between about 500 and about 1500° C., and advantageously between about 700 and about 1200° C.

The reaction is carried out under atmospheric pressure or reduced pressure, but operation at a reduced pressure, e.g. about 10 to 100 mm. Hg is optimal.

The starting material (I) is liquid at room temperature (about 20° C. to about 30° C.), and is easily vaporized by heating at about 150° C. or a little higher even under atmospheric pressure. Therefore, the present method can advantageously be conducted by first heating the nitrile at its boiling point or a little higher to produce the gaseous nitrile, and then subjecting the latter to pyrolysis at desired temperatures.

Practically, the method is carried out by introducing the gaseous nitrile into a tubular reactor made of e.g. quartz, which is disposed in a horizontal or vertical furnace kept at the desired temperature throughout the reaction. As the reactor, a tubular type is desirable, but any other type may be used. It is also possible to stuff the reactor with appropriate catalysts such as magnesium chloride, barium chloride or any other additives or, if desired, to conduct the reaction in the prosence of an inert gas such as nitrogen gas, carbon dioxide gas and the like.

Thus-obtained crude cyanoacetylene can easily be recovered by applying conventional procedures such as sublimation or distillation to give refined cyanoacetylene melting at 5° C. and boiling at 42° C., these constants being in good accord with the recorded values in the literature.

The following examples are merely for illustrative purposes, and are not to be construed as limitation of the present invention. In these examples, the relationship between parts by weight and parts by volume is the same as that between grams and milliliters.

In the examples, "mm." is millimeters.

EXAMPLE 1

A tubular quartz reactor of 20 parts by volume in capacity is used, one end of which is connected with a vacuum distillation vessel equipped with an inert gas inlet and a thermometer, and the other end of which is connected with a vacuum pump through a series of collectors cooled by ethanol-Dry Ice and a self-adjusting vacuum manometer.

The whole apparatus is previously filled with nitrogen gas, and the middle part of the reactor is heated by an electric furnace at 1000° C.

40 parts by weight of $\alpha,\beta$-dichloropropionitrile is charged into the vessel, the vessel being initially heated to 150° C., while the pressure of the whole apparatus is reduced to 25 mm. Hg by means of a vacuum pump, whereby the nitrile is vaporized and is led to the reactor together with nitrogen gas which is constantly introduced into the vessel through the inlet, though in minor quantity.

After continuing the procedure for 3 hours, the starting material in the vessel is completely consumed, and the substantial parts of the reaction product have been caught in the first collector.

Thus-obtained reaction product is refined by distillation to give 11.8 parts by weight of cyanoacetylene (yield 72%).

EXAMPLE 2

In the same manner as in Example 1, 5 parts by weight of $\alpha$-chloroacrylonitrile is subjected to a gas phase reaction except that the procedure is continued for 30 minutes.

Thus, 1.54 parts by weight of cyanoacetylene is produced and 0.34 part by weight of the starting material is recovered.

EXAMPLE 3

In the same manner as in Example 1, 10 parts by weight of trans-$\beta$-chloroacrylonitrile is subjected to a gas phase reaction except that the procedure is continued for 30 minutes.

Thus, 3.24 parts by weight of cyanoacetylene is produced, and 1.86 parts by weight of the starting material is recovered (yield 68.2%).

EXAMPLE 4

In the same manner as in Example 1, 40 parts by weight of β,β-dichloropropionitrile is subjected to a gas phase reaction.

Thus, 12.0 parts by weight of cyanoacetylene is produced (yield 73%).

EXAMPLE 5

In the same manner as in Example 1, 40 parts by weight of α,α-dichloropropionitrile is subjected to a gas phase reaction.

Thus, 12.0 parts by weight of cyanoacetylene is produced (yield 73%).

What is claimed is:

1. A method for producing cyanoacetylene, which comprises subjecting a member selected from the group consisting of α,β-dichloropropionitrile, α-chloroacrylonitrile, β-chloroacrylonitrile, β,β-dichloropropionitrile, and α,α-dichloropropionitrile to gas phase reaction at 500 to 1500° C.

2. A method according to claim 1, wherein the chlorine-substituted tricarbon nitrile is α,β-dichloropropionitrile.

3. A method according to claim 1, wherein the chlorine-substituted tricarbon nitrile is α-chloroacrylonitrile.

4. A method according to claim 1, wherein the chlorine-substituted tricarbon nitrile is β-chloroacrylonitrile.

5. A method according to claim 1, wherein the chlorine-substituted tricarbon nitrile is β,β-dichloropropionitrile.

6. A method according to claim 1, wherein the chlorine-substituted tricarbon nitrile is α,α-dichloropropionitrile.

7. A method according to claim 1, wherein the said reaction is carried out at a temperature between 700° C. and 1200° C.

8. A method according to claim 1, wherein the said reaction is carried out under a pressure of 10 to 100 mm. Hg.

References Cited

UNITED STATES PATENTS

| | | | |
|---|---|---|---|
| 3,006,948 | 10/1961 | Happel et al. | 260—465.9 |
| 3,079,423 | 2/1963 | Comp | 260—465.3 |
| 3,079,424 | 2/1963 | Krebaum | 260—465.3 |
| 3,141,034 | 7/1964 | Krebaum | 260—465.9 |

JOSEPH P. BRUST, Primary Examiner

U.S. Cl. X.R.

260—465.7